United States Patent
Raskin et al.

(10) Patent No.: US 9,076,003 B2
(45) Date of Patent: Jul. 7, 2015

(54) METHOD AND APPARATUS FOR TRANSPARENTLY ENCRYPTING AND DECRYPTING COMPUTER INTERFACE DATA

(71) Applicant: JANUS TECHNOLOGIES, INC., Half Moon Bay, CA (US)

(72) Inventors: Sofin Raskin, Los Altos, CA (US);
Alexander Rezinsky, Katzir (IL);
Joshua Porten, Austin, TX (US);
Michael Wang, Taipei (TW)

(73) Assignee: JANUS TECHNOLOGIES, INC., Half Moon Bay, CA (US)

( * ) Notice: Subject to any disclaimer, the term of this patent is extended or adjusted under 35 U.S.C. 154(b) by 0 days.

(21) Appl. No.: 13/971,632

(22) Filed: Aug. 20, 2013

(65) Prior Publication Data
US 2015/0058637 A1 Feb. 26, 2015

(51) Int. Cl.
*H04L 29/06* (2006.01)
*G06F 21/60* (2013.01)
*G06F 21/83* (2013.01)

(52) U.S. Cl.
CPC ............ *G06F 21/602* (2013.01); *G06F 21/606* (2013.01); *G06F 21/83* (2013.01); *H04L 63/0428* (2013.01)

(58) Field of Classification Search
CPC ..... G06F 21/602; G06F 21/606; G06F 21/83; H04L 63/0428
USPC .......................................................... 713/189
See application file for complete search history.

(56) References Cited

U.S. PATENT DOCUMENTS

| | | | |
|---|---|---|---|
| 4,598,170 | A | 7/1986 | Piosenka et al. |
| 5,191,542 | A | 3/1993 | Murofushi |
| 5,724,027 | A | 3/1998 | Shipman et al. |
| 5,946,469 | A | 8/1999 | Chidester |
| 6,061,794 | A | 5/2000 | Angelo et al. |
| 6,088,802 | A | 7/2000 | Bialick et al. |
| 6,414,523 | B1 * | 7/2002 | Yoshizaki ............... 327/112 |

(Continued)

FOREIGN PATENT DOCUMENTS

| | | |
|---|---|---|
| EP | 2517144 | 7/2011 |
| EP | 2407905 | 1/2012 |

(Continued)

OTHER PUBLICATIONS

Garfinkel, "Terra: A Virtual Machine-Based Platform for Trusted Computing", ACM SOSP, Proc. of the ACM Symp. on Operating system Printciples, Oct. 22, 2003, pp. 193-206.

(Continued)

*Primary Examiner* — Michael S McNally
(74) *Attorney, Agent, or Firm* — Pillsbury Winthrop Shaw Pittman LLP

(57) ABSTRACT

In general, embodiments of the invention include methods and apparatuses for securing otherwise unsecured computer interfaces by performing transparent data encryption and decryption. According to certain transparency aspects, the encryption and decryption functionality of the invention do not require any changes to the software layers such as file systems, device drivers, operating systems, or applications. Embodiments of the invention offload encryption key management to a centralized key management system that can be remotely located from the secured computer. Alternative embodiments perform key management locally.

22 Claims, 13 Drawing Sheets

(56) References Cited

U.S. PATENT DOCUMENTS

| | | |
|---|---|---|
| 6,457,164 B1 | 9/2002 | Hwang et al. |
| 6,507,914 B1 | 1/2003 | Cain et al. |
| 6,546,491 B1 | 4/2003 | Challener et al. |
| 6,594,780 B1 | 7/2003 | Shen et al. |
| 6,668,326 B1 | 12/2003 | Sella et al. |
| 6,725,438 B2 | 4/2004 | van Ginneken |
| 6,782,424 B2 | 8/2004 | Yodaiken |
| 6,820,160 B1 | 11/2004 | Allman |
| 6,922,817 B2 | 7/2005 | Bradfield et al. |
| 7,120,892 B1 | 10/2006 | Knol et al. |
| 7,149,992 B2 | 12/2006 | Chang et al. |
| 7,240,303 B1 | 7/2007 | Schubert |
| 7,320,071 B1 | 1/2008 | Friedman et al. |
| 7,330,891 B2 | 2/2008 | Yodaiken |
| 7,337,100 B1 | 2/2008 | Hutton et al. |
| 7,340,700 B2 | 3/2008 | Emerson |
| 7,350,204 B2 | 3/2008 | Lambert et al. |
| 7,396,257 B2 | 7/2008 | Takahashi |
| 7,469,343 B2 | 12/2008 | Ray |
| 7,478,235 B2 | 1/2009 | England et al. |
| 7,516,217 B2 | 4/2009 | Yodaiken |
| 7,635,272 B2 | 12/2009 | Poppe |
| 7,677,065 B1 | 3/2010 | Miao |
| 7,822,994 B2 * | 10/2010 | Hamaguchi ............ 713/193 |
| 7,962,755 B2 | 6/2011 | Pizano et al. |
| 7,987,497 B1 | 7/2011 | Giles et al. |
| 8,161,524 B2 * | 4/2012 | Oh et al. .................... 726/2 |
| 8,402,529 B1 | 3/2013 | Green et al. |
| 8,429,419 B2 | 4/2013 | Endrys |
| 8,566,934 B2 | 10/2013 | Srivastava |
| 8,606,971 B2 | 12/2013 | Cain et al. |
| 8,627,106 B2 | 1/2014 | Pizano et al. |
| 2002/0007456 A1 | 1/2002 | Peinado et al. |
| 2002/0069396 A1 | 6/2002 | Bhattacharya et al. |
| 2004/0003262 A1 * | 1/2004 | England et al. .......... 713/189 |
| 2004/0199879 A1 | 10/2004 | Bradfield |
| 2005/0240892 A1 | 10/2005 | Broberg et al. |
| 2006/0282652 A1 * | 12/2006 | El-Haj-mahmoud et al. .... 713/1 |
| 2007/0088959 A1 | 4/2007 | Cox et al. |
| 2007/0255963 A1 | 11/2007 | Pizano et al. |
| 2008/0091833 A1 | 4/2008 | Pizano et al. |
| 2008/0247540 A1 | 10/2008 | Ahn et al. |
| 2008/0263658 A1 | 10/2008 | Michael et al. |
| 2009/0013111 A1 | 1/2009 | Berland et al. |
| 2009/0033668 A1 | 2/2009 | Pederson et al. |
| 2009/0212844 A1 | 8/2009 | Darmawan et al. |
| 2010/0024004 A1 | 1/2010 | Boegelund et al. |
| 2010/0192230 A1 | 7/2010 | Steeves et al. |
| 2010/0201400 A1 | 8/2010 | Nardone et al. |
| 2010/0228993 A1 * | 9/2010 | Suzuki ................. 713/189 |
| 2011/0102443 A1 | 5/2011 | Dror et al. |
| 2011/0131423 A1 | 6/2011 | Ponsini |
| 2011/0258460 A1 | 10/2011 | Pizano et al. |
| 2012/0017197 A1 | 1/2012 | Mehta et al. |
| 2012/0192129 A1 | 7/2012 | Bowers |
| 2013/0067534 A1 | 3/2013 | Soffer |
| 2013/0097430 A1 | 4/2013 | Mittelstadt et al. |
| 2013/0212671 A1 | 8/2013 | Wang et al. |
| 2013/0238908 A1 | 9/2013 | Pizano |

FOREIGN PATENT DOCUMENTS

| | | |
|---|---|---|
| EP | 2677452 | 12/2013 |
| KR | 10-1118826 | 4/2012 |

OTHER PUBLICATIONS

Landau, et al., "SlitX: S;lit Guest/Hypervisor Execution on Multi-Core", 3$^{rd}$ Workshop of IO irtualization, Jun. 14, 2011, pp. 1-7.

International Search Report and Written Opinion issued Nov. 28, 2014 in corresponding PCT/US2014/051694.

* cited by examiner

METHOD AND APPARATUS FOR TRANSPARENTLY ENCRYPTING AND DECRYPTING COMPUTER INTERFACE DATA

FIELD OF THE INVENTION

A system and method for securing computer systems with otherwise non-secure I/O interfaces. Embodiments of the invention implement security functions such as transparent data encryption and decryption for otherwise unsecure computer interfaces such as USB.

BACKGROUND OF THE INVENTION

Conventional computing devices typically include one to many conventional types of input/output (I/O) ports for communicating with connectable external devices such as mice, keyboards, wireless modems, etc.

However, the specifications for many I/O interfaces, such as USB, SAS, SATA, Firewire, PCI Express, Hypertransport, Thunderbolt, etc. have no provision for authenticating attached devices or encrypting their traffic. One way to secure communication in such devices is by changing software layers (drivers, applications). This is impractical to implement due to variety of different software stack implementations and lack of interoperability. This is the main reason why this approach did not gain a widespread adoption. Another option is to encrypt the entire file system. This approach also suffers from lack of interoperability. Both approaches have another disadvantage: the key to perform encryption is stored in the same system, which weakens overall security. Examples of prior art approaches include U.S. Patent Application Number 2008/0247540, U.S. Pat. No. 7,469,343 and EP Application No. EP240790.

Meanwhile, there are a number of applications that would benefit greatly from data encryption, such as storing sensitive data on USB mass storage devices. Accordingly, a need remains for an efficient method for encrypting and decrypting data on otherwise unsecure interfaces such as USB.

SUMMARY OF THE INVENTION

In general, embodiments of the invention include methods and apparatuses for securing otherwise unsecured computer interfaces by performing transparent data encryption and decryption. According to certain transparency aspects, the encryption and decryption functionality of the invention do not require any changes to the software layers such as file systems, device drivers, operating systems, or applications. Embodiments of the invention offload encryption key management to a centralized key management system that can be remotely located from the secured computer. Alternative embodiments perform key management locally.

In accordance with these and other aspects, a system for transparently encrypting and decrypting computer system I/O data according to embodiments of the invention includes an I/O interface, a host processor including a host for sending and receiving data via the I/O interface, and a secure subsystem interposed between the I/O interface and the host processor that transparently encrypts and decrypts the data.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, embodiments of the invention enable securing otherwise unsecured I/O communications. According to one aspect, embodiments of the invention implement encrypting and decrypting of data sent over an I/O connection. According to certain additional aspects, the security functions performed by embodiments of the invention can be logically transparent to the upstream host and to the downstream device.

Figure 1:
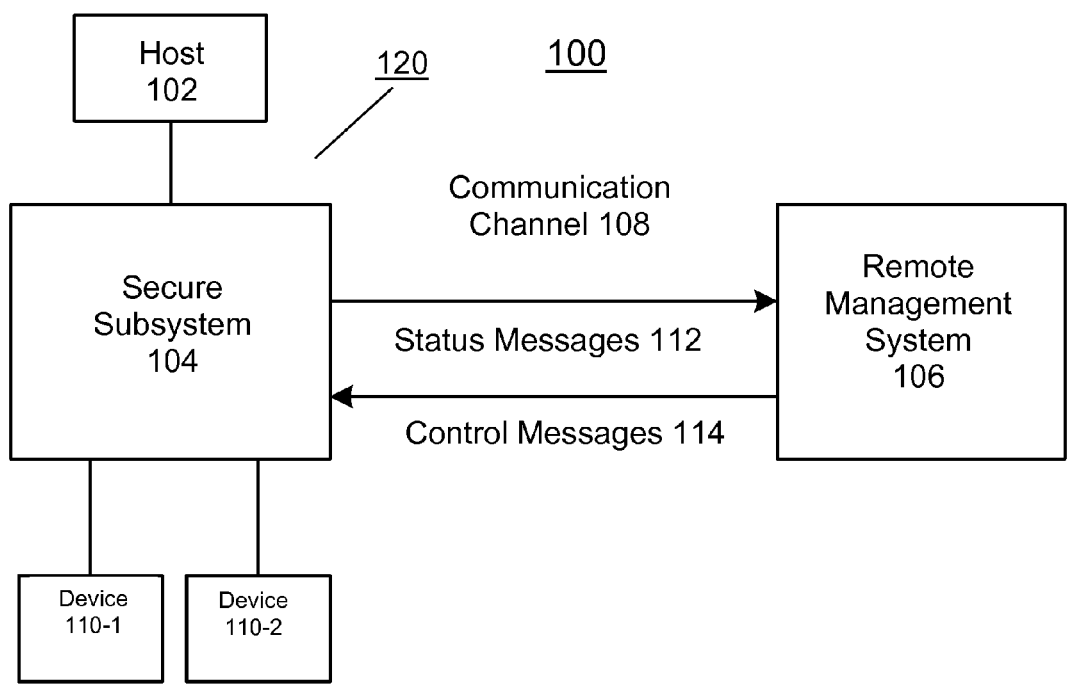
FIG. 1 is a block diagram illustrating an example subsystem for securing I/O communications according to embodiments of the invention.

FIG. 1 is a system level block diagram of a management system 100 according to embodiments of the invention. As shown, system 100 includes a managed secure computer 120 comprising a Host 102, Secure Subsystem 104, and two directly attached devices 110-1 and 110-2.

There are many possible configurations of system 100, host 102, subsystem 104 and attached devices 106 that all fall within the scope of the invention, and the present invention is not limited to any particular configuration. In one non-limiting example configuration, secure computer 120 is a standalone computer system, similar to a conventional desktop, laptop or pad computer. In such an example, host 102 is implemented by a CPU (e.g. x86), a conventional operating system such as Windows and associated device driver software and can further include I/O interfaces such as USB hosts, SATA hosts, etc. In accordance with certain aspects of the invention, in this example, the operation and functionality of subsystem 104 is completely transparent to the host 102 and associated operating system and application software. Moreover, the operating experience of secure computer 120 by a user is identical to the experience of a conventional desktop, laptop or pad computer, apart from the security functionality of the present invention. So while the application software that can run on the computer is virtually unrestricted, use of devices 106 is strictly controlled by subsystem 106 which enforces security policies as will be described in more detail below.

In these and other embodiments, subsystem 104 is preferably an embedded system. As such, it runs a designated software system furnished together with an embedded processor, and cannot be modified by the end-user of the computer under any circumstances. According to aspects of the present invention, subsystem 104 is responsible for parsing and transparently encrypting or decrypting data streams.

An example architecture for implementing subsystem 104 together with host 102 is described in co-pending application Ser. No. 13/971,651, the contents of which are incorporated by reference herein. Those skilled in the art will understand how to implement the principles of the present invention in various configurations of secure computer 120 after being taught by the present disclosure.

Devices 110 can include internal and external storage devices such as disk drives, thumb drives, memory cards, etc., etc. that use interfaces such as SATA and USB. The number and type of peripherals can depend on the particular form factor of secure computer 120.

Devices 106 can also include network access interfaces such as Ethernet, Firewire, etc. Various aspects of performing security functionality in secure computer 120 that can be adapted for use in, and/or practiced together with, the present invention are described in more detail in co-pending application Ser. No. 13/971,582, the contents of which are incorporated herein by reference in their entirety.

FIG. 1 further shows a Remote Management system 106 coupled to secure subsystem 104 of secure computer 120 by a communication channel 108. FIG. 1 also shows the different message types that can be sent over a Communication Channel 108, specifically status messages 112 from secure subsystem 104 to remote management system 106 and control messages 114 from remote management system 106 to secure subsystem 104.

Although FIG. 1 shows remote management system 106 coupled to only one secure subsystem 104, it should be apparent that one or more additional secure subsystems 104 may be similarly coupled to remote management system 106.

Channel 108 can be implemented in various ways, possibly depending on the number and type of devices to be managed by system 106. Channel 108 can be a separate direct point-to-point link between system 106 and subsystem 104. In other embodiments, channel 108 can be implemented by a transmission medium that is shared between many subsystems 104. In these and other embodiments, the medium can be any combination of wired or wireless media, such as Ethernet or Wireless LAN. In these and other embodiments, channel 108 can be implemented by various types and/or combinations of public and private networks using proprietary protocols or conventional protocols such as UDP or TCP. In embodiments, data sent over communication channel 108 is encrypted, for example using secure VPN, to improve security.

According to general aspects, in embodiments of the invention, remote management system 106 is responsible for managing policies that can include lists of allowed devices as well as their encryption keys. Based on these lists, and devices attached to interfaces of computer 120, remote management system 106 sends appropriate keys to subsystem 104 via channel 108.

Control messages 114 sent from Remote Management System 106 to one or more Secure I/O Subsystems 104 contain different configuration commands and settings such as encryption keys to be described in more detail below. Status messages 112 sent from one or more Secure I/O Subsystem 104 to Remote Management System 106 contain different notifications and alerts. Example of status messages 112 include notifications of attached devices 110, and information regarding attached devices 110 such as when the device was connected and removed, who was logged in at the time the device was attached, activity level (e.g. how much data was read and/or written), etc.

Various aspects of a remote management system that can be adapted for use in the present invention are described in more detail in co-pending application Ser. No. 13/971,711, the contents of which are incorporated herein by reference in their entirety.

Figure 2:
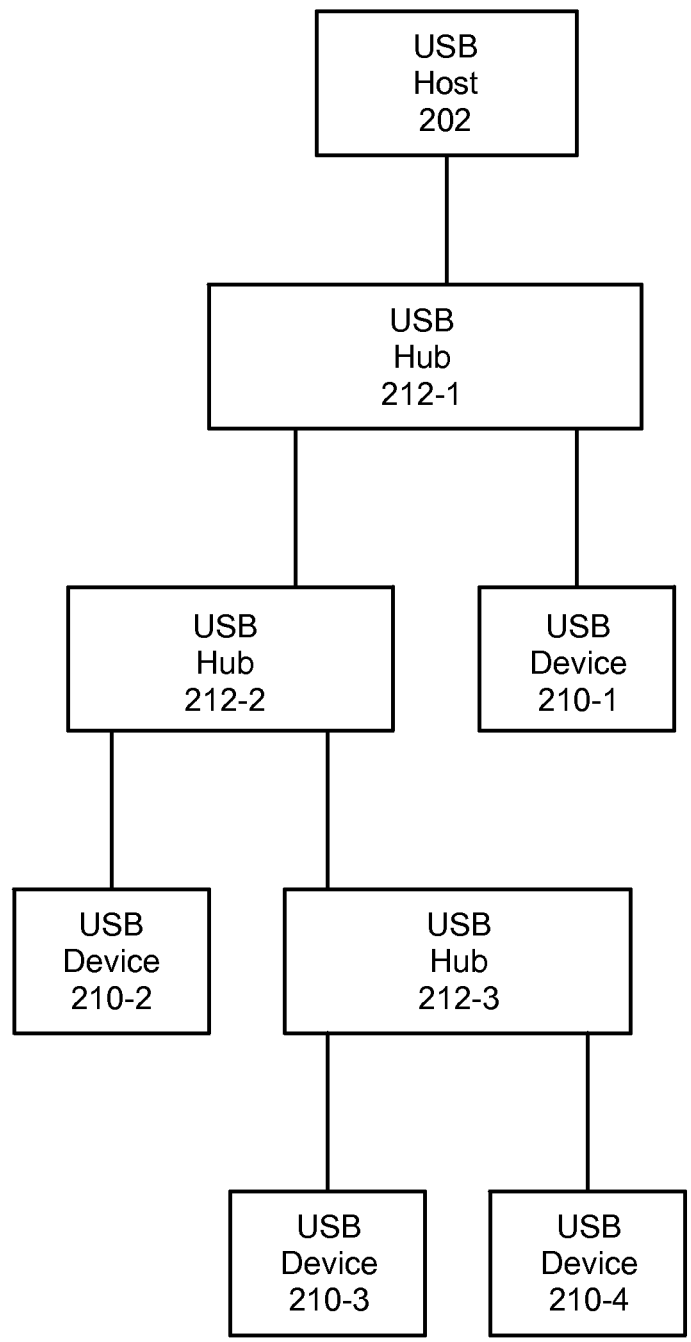
FIG. 2 is a block diagram illustrating existing USB I/O communications.

As mentioned previously, aspects of the invention include providing security functionality over otherwise unsecure communications. FIG. 2 shows an example of an existing unsecure USB topology. As is known, USB allows a more complex topology than certain other types of interfaces. In the example shown in FIG. 2, a USB Host 202 is connected to multiple USB Devices 210, including via USB Hubs 212.

Figure 3:
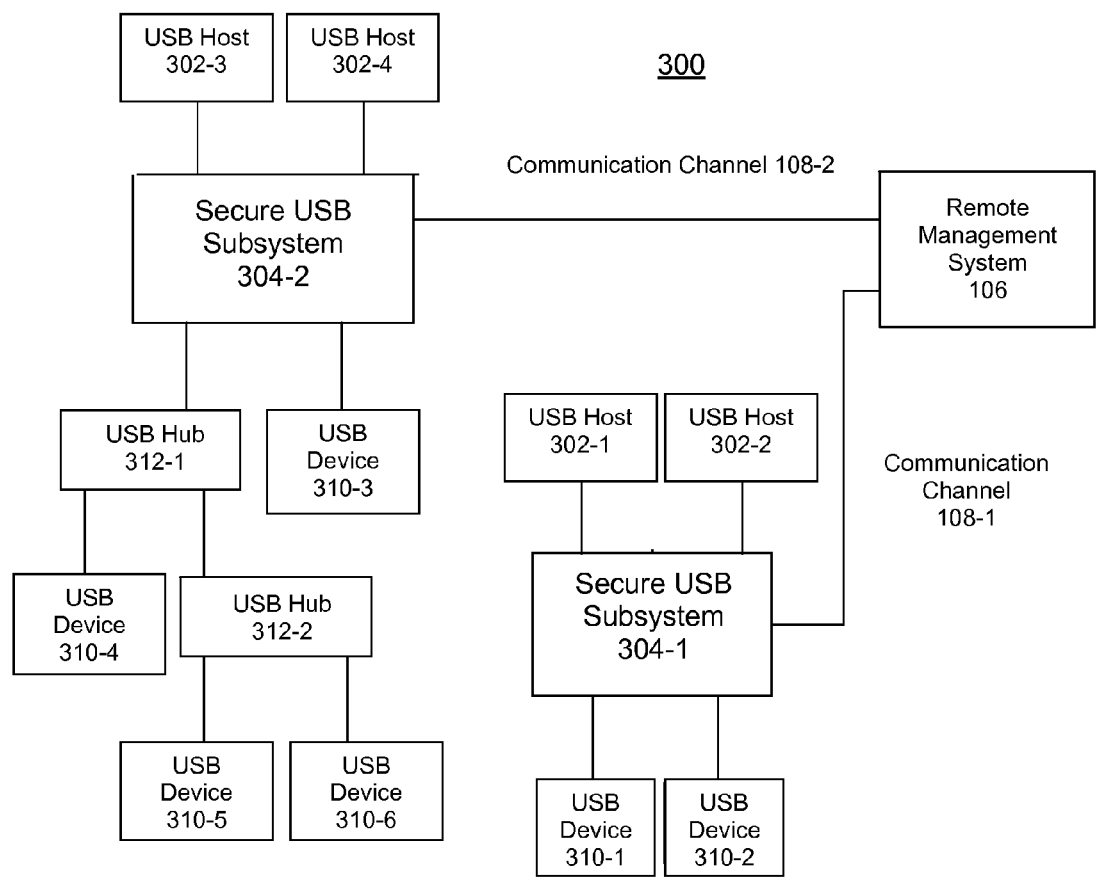
FIG. 3 is a block diagram illustrating an example subsystem for securing USB I/O communications according to embodiments of the invention.

FIG. 3 is a block diagram illustrating another example management system 300 according to embodiments of the invention. In this example, the system manages security of two USB secure subsystems 304-1 and 304-2 connected to Remote Management System 106 via respective communication channels 108-1 and 108-2.

As can be seen in comparison to FIG. 2, the topology of the system 300 is made secure by the inclusion of secure USB subsystems 304, remote management system 106 and communication channel 108.

As set forth above in connection with the more general example of FIG. 1, secure USB subsystems 304 are responsible for parsing and transparently encrypting or decrypting data streams according to policies managed by remote system 106 and keys provided by remote system 106. In embodiments such as that shown in FIG. 4A, subsystems 304 are implemented on a chip that is included the same semiconductor device (e.g. SOC) or printed circuit board (PCB) 404-A as USB Hosts 302. In this embodiment, unencrypted data is securely communicated between subsystems 304 and USB hosts 302 by virtue of subsystems 304 and hosts 302 being inaccessible to third parties. For example, where 404-A is a PCB, communication signals between subsystem can be buried inside PCB circuit traces. As further shown, subsystem communicates encrypted data with a USB device 310 (e.g. a physical storage device) that is external to PCB or SOC 404.

Figure 4A:
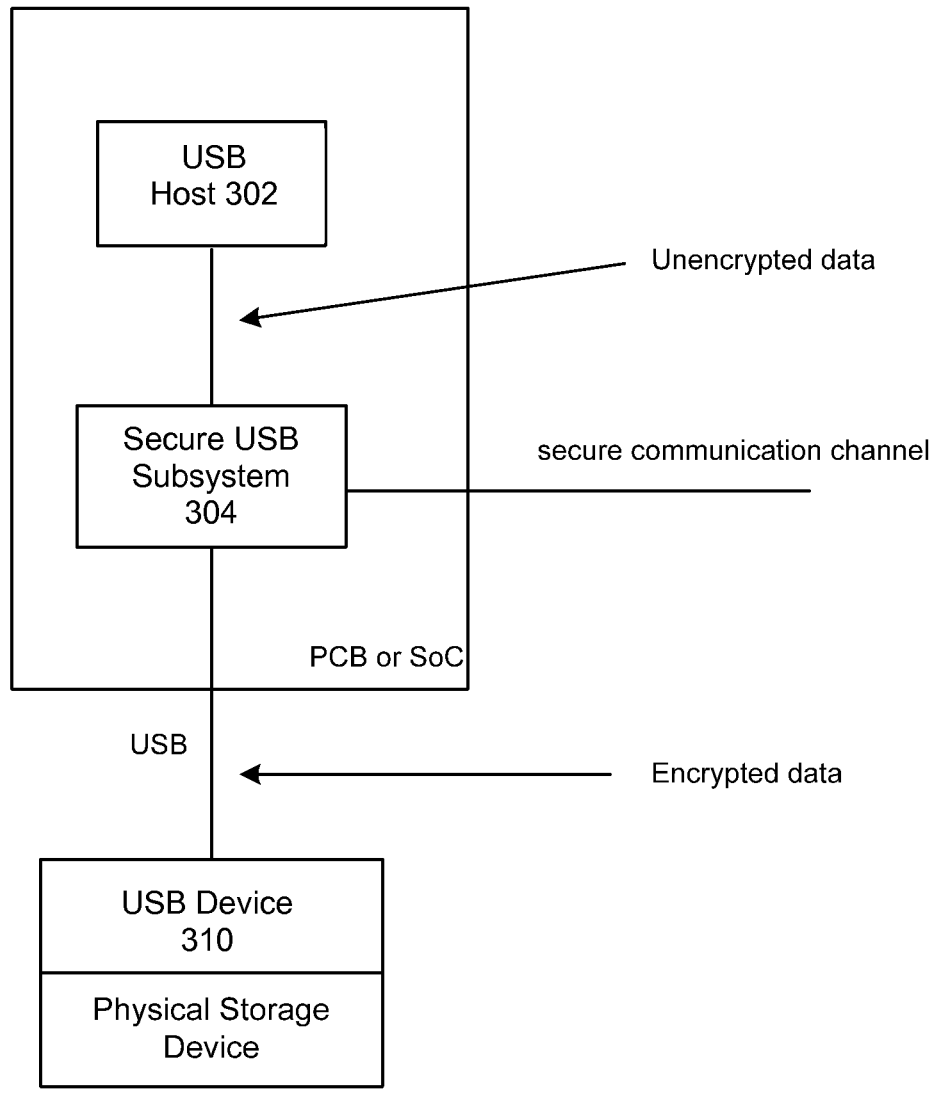
FIG. 4A is a block diagram further illustrating an example implementation for the secure USB subsystem shown in FIG. 3.
Figure 4B:
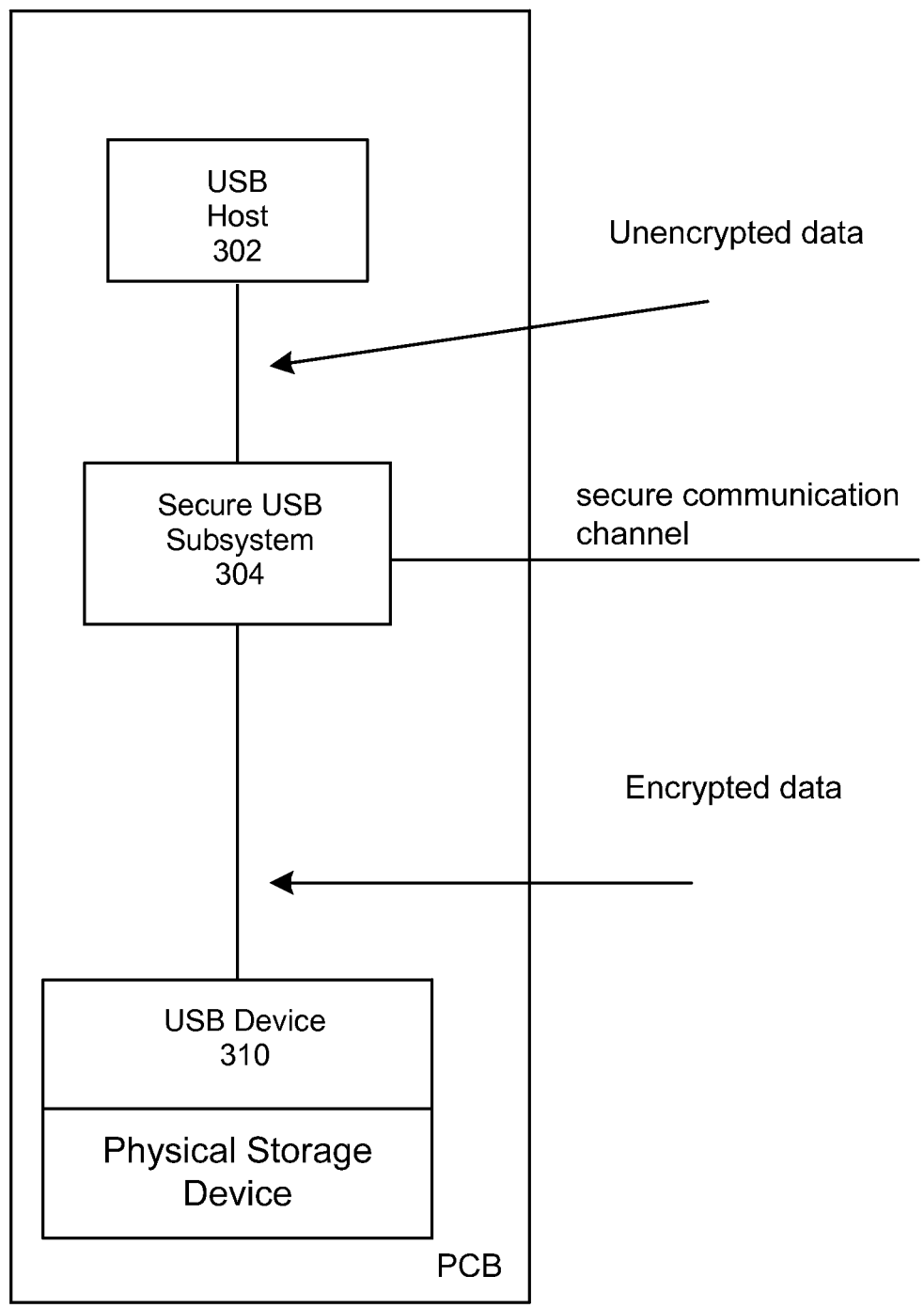
FIG. 4B is a block diagram further illustrating another example implementation for the secure USB subsystem shown in FIG. 3.

In alternative embodiments such as that shown in FIG. 4B, USB Hosts 302, secure USB subsystems 304 and USB devices 310 (e.g. a physical storage device such as an internal Flash Drive) are all implemented together on a common PCB 404-B. In these embodiments, the encrypted communications between subsystems 304 and devices 310 are even further secured via signals on inaccessible PCB traces.

As shown in FIGS. 4A and 4B, USB devices 310 are commonly implemented together with the associated hardware, such as flash memory. Moreover, in embodiments described in more detail below, software and hardware layers above USB Hosts 302 are also inaccessible by third parties for eavesdropping.

As further shown in FIG. 3, management system 300 manages secure USB communications for four USB Hosts 302-1, 302-2, 303-3 and 302-4, two USB Hubs 312-1 and 312-2, and six USB devices 310-1 to 310-6 connected either directly to the Secure USB Subsystems 304-1 and 304-2 or via USB Hubs 312-1 and 312-2. As described above, USB Host 302-1 or 302-2 can be included in a variety of computing devices including, but not limited to a server, a PC, or an embedded device such as secure computer 120. In embodiments shown in FIG. 3, subsystems 304 are included in separate secure computers 320, but this is not necessary.

Figure 5:
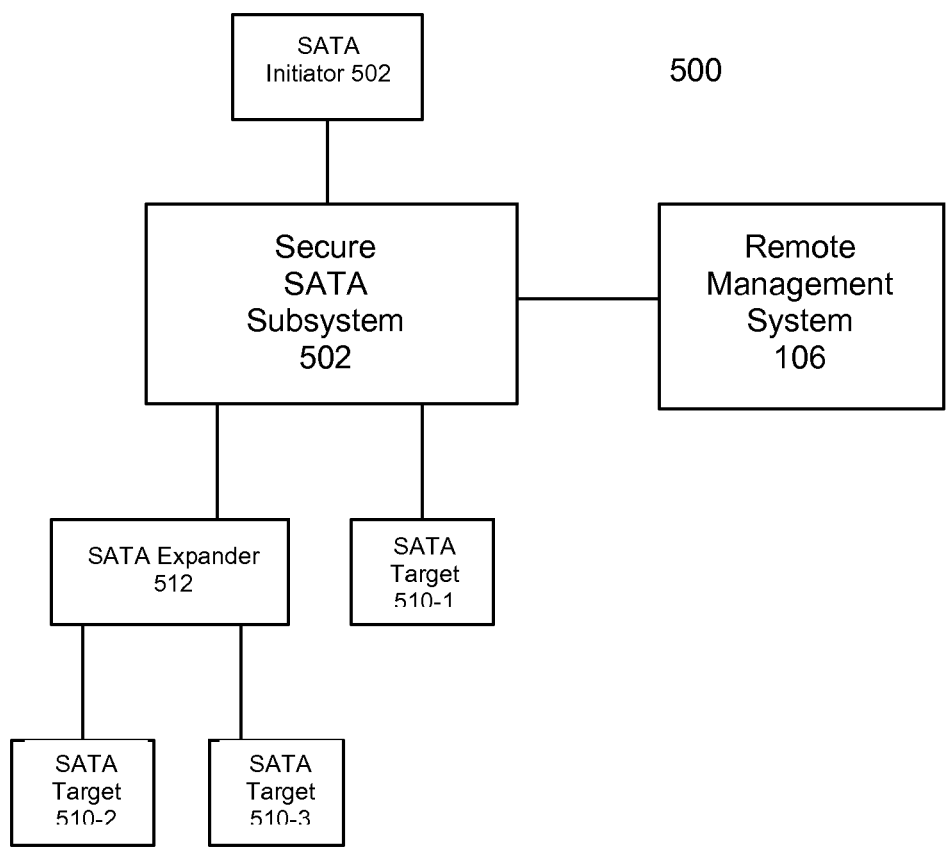
FIG. 5 is a block diagram illustrating an example subsystem for securing SATA I/O communications according to embodiments of the invention.

FIG. 5 is a block diagram illustrating an example management system 500 for securing SATA communications according to embodiments of the invention.

As shown, secure SATA subsystem 504 has upstream port(s) coupled to SATA initiator 502 and downstream ports coupled to SATA target 510-1 and SATA expander 530. SATA expander 530 is further coupled to SATA targets 510-2 and 510-3.

As set forth above in connection with the more general example of FIG. 1, secure SATA subsystem 504 is responsible for parsing and transparently encrypting or decrypting data streams according to policies managed by remote system 106 and keys provided by remote system 106. An example architecture for securing SATA communications that can be adapted for use in the present invention is described in more detail in co-pending application Ser. No. 13/971,732, the contents of which are incorporated herein by reference in their entirety.

Figure 6:
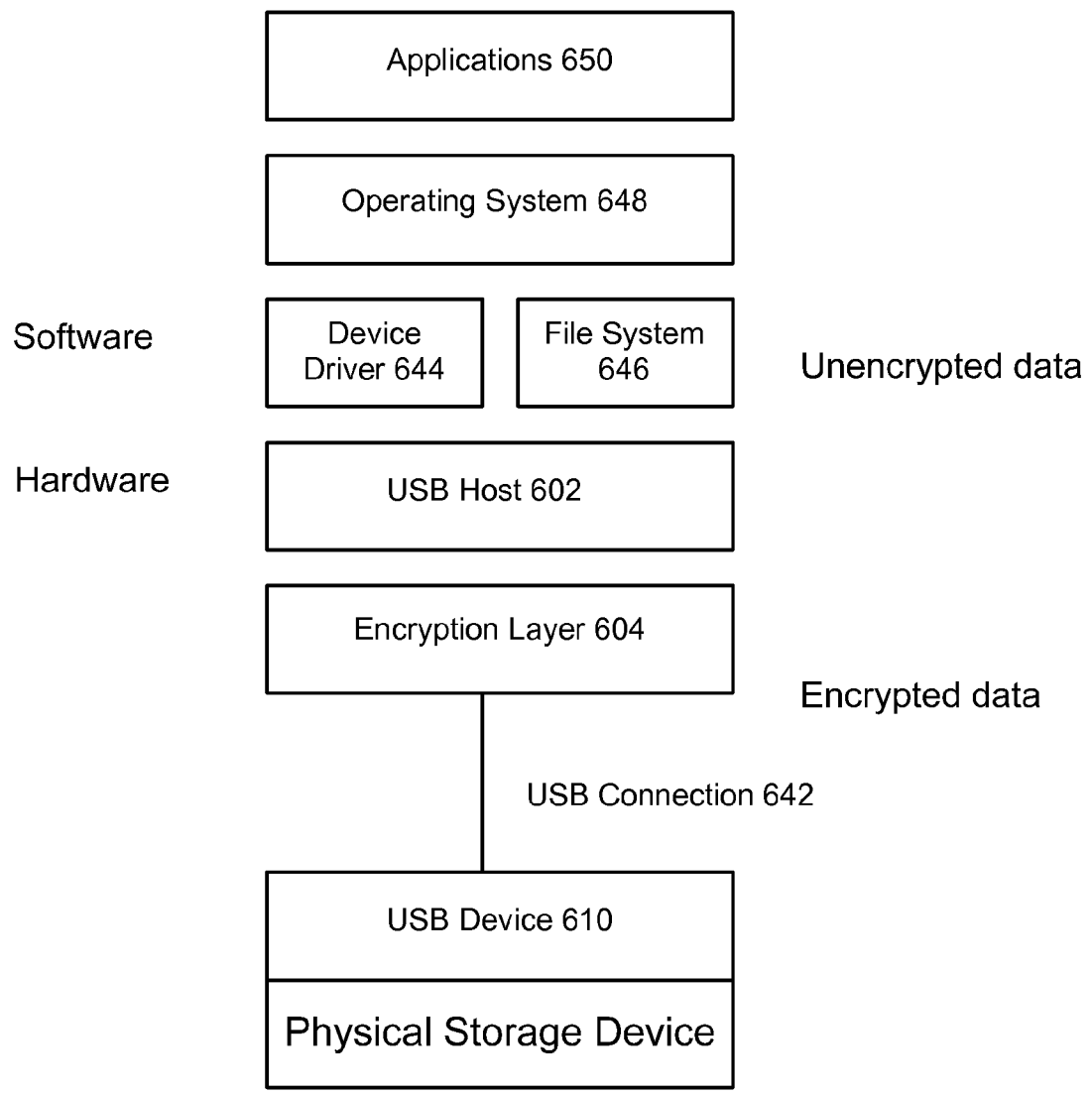
FIG. 6 is a block diagram illustrating how example secure USB subsystems according to embodiments of the invention are included in the data flow of typical hardware and software layers.

FIG. 6 is another view of a system for securing USB communications according to embodiments of the invention, broken down into software and hardware layers involved in the data flow.

In this example, the hardware device associated with USB device 610 is a physical storage device 640, such as a hard drive or thumb drive. USB Device 610 is responsible for converting data carried by an industry-standard USB protocol into a vendor-specific data format used by physical storage device 640. USB Device 610 is connected to the secure subsystem 604 via a connection 642 such as a USB cable. As shown, subsystem 604 in this embodiment of the invention implements an Encryption Layer. It performs transparent encryption and decryption of the data passing between USB host 602 and device 610.

As further shown in FIG. 6, in software layers above USB host 602 are device driver 644 and file system 646. Examples of File Systems are FAT32, NTFS, or ext4. Both USB Device Driver 644 and File System 646 are unaware of the fact that the data is encrypted.

In software layers above device driver 644 and file system 646 is operating system 648. Examples of Operating Systems are Linux, Mac OS, Windows, Android, or iOS. Applications 650 are shown in software layers above operating system 648.

It should be noted that other I/O types, such as SATA, etc. have a similar hardware and software structure to the USB structure shown in FIG. 6, and those skilled in the art will understand how to implement the invention in such other I/O types after being taught by the present disclosure.

Figure 7:
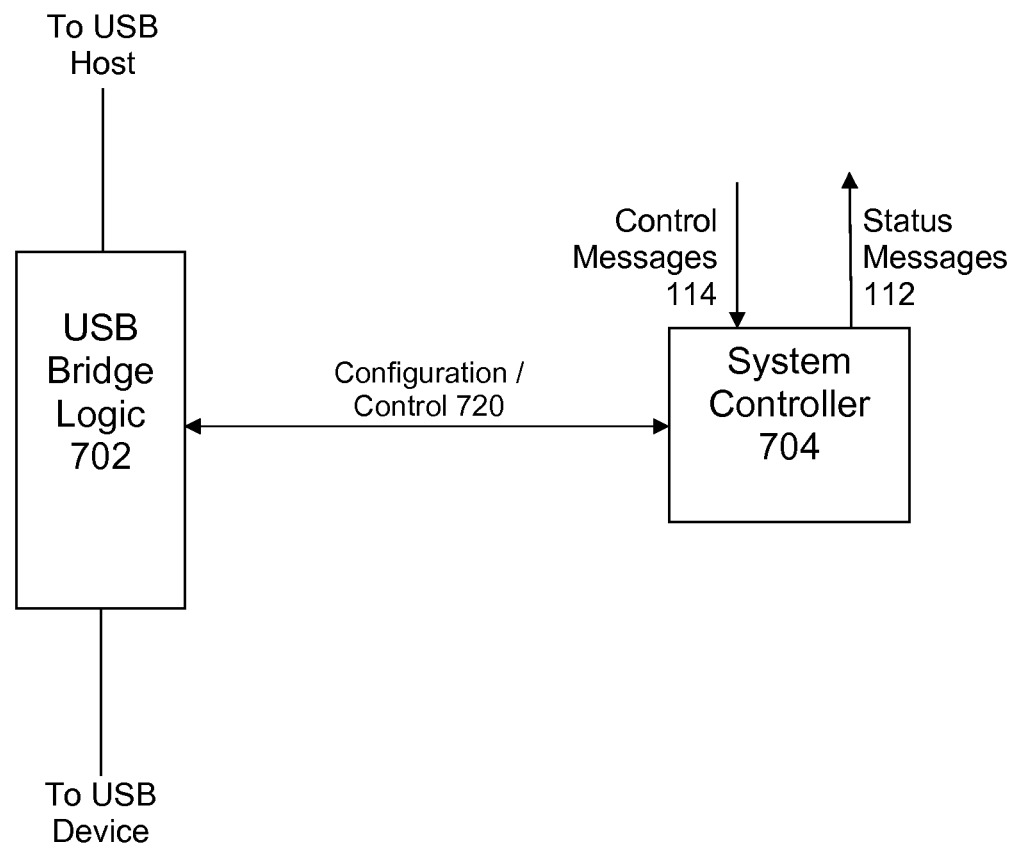
FIG. 7 is a block diagram further illustrating an example secure USB subsystem that can implement the subsystem shown in FIG. 6.

FIG. 7 is a block diagram illustrating an example implementation of a Secure USB subsystem 604 according to embodiments of the invention. In this example, although only one is shown, subsystem 604 includes one or more instances of USB Bridge Logic 702 coupled to system controller 704.

USB Bridge Logic 702 is connected between an upstream port and a downstream port. The upstream port can be connected to a USB host, either directly or via a USB hub. The downstream port can be connected to one or more USB devices, either directly or via a USB hub.

Configuration/control 720 lines are shown to illustrate additional communications between system controller 704 and bridge logic 702 as should become apparent from the following descriptions.

System controller 704 is implemented by a processor with associated software and/or firmware, a FSM in ASIC/FPGA, or any combination thereof. It receives policies and keys from the management system 106 via control messages 114. In response to messages of new devices being detected by any USB bridge logic 702, perhaps after consulting local policies or exchanging messages with management system 106, it determines how the device should be configured for secure use, if at all. It then provides any configuration information to the associated bridge logic 702, perhaps also including an encryption key.

Figure 8:
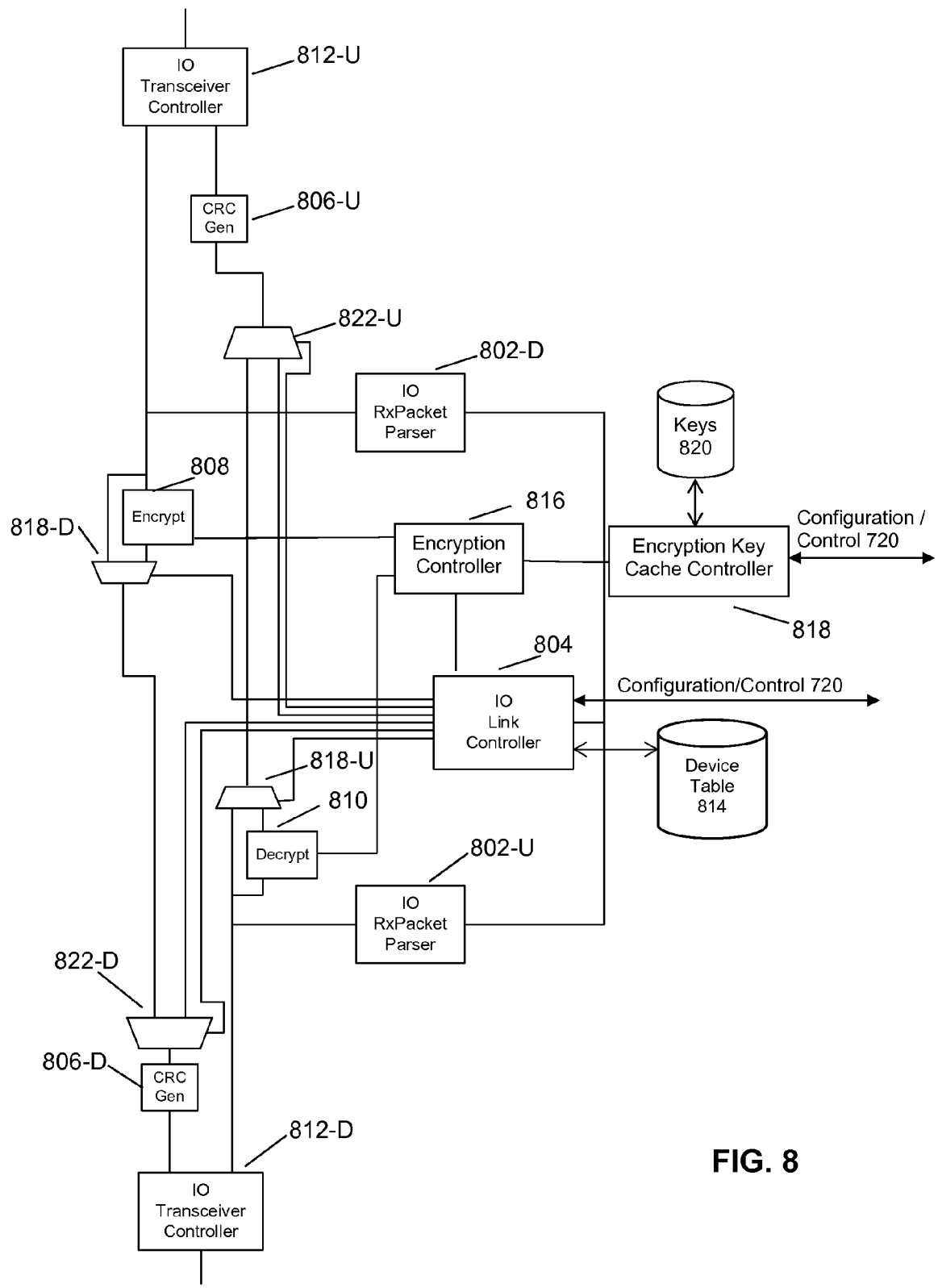
FIG. 8 is a block diagram illustrating an example configuration of bridge logic that can be included in a subsystem such as that shown in FIG. 7.

FIG. 8 is a block diagram of one example implementation of USB Bridge Logic 702 according to embodiments of the invention.

In the example shown in FIG. 8, logic 702 includes USB Receive Packet Parser 802-D (for downstream data) and 802-U (for upstream data), USB Link Controller 804, CRC generator 806-D (for downstream data) and 806-U (for upstream data), encryption module 808 (for downstream data) and decryption module 810 (for upstream data), USB transceiver controller 812-U (for coupling to upstream ports) and 812-D (for coupling to downstream ports), USB device table 814, encryption controller 816, encryption key cache controller 818 and encryption keys 820.

USB Receive Packet Parser 802 (both upstream and downstream) is responsible for parsing received packets, decoding packet headers, extracting information and passing it to the Link Controller 804.

In general, USB Link Controller 804 performs a variety of functions for managing the passing of USB traffic between upstream and downstream ports according to configurations provided by system controller 704.

Using messages parsed by upstream packet parser 802-U, USB Link Controller 404 detects direct attachment of a new device to a downstream port, and also detects attachment of a new device to one of the USB hubs connected to a downstream port. The latter is performed by monitoring hub port change messages sent to the host.

Also using messages parsed by upstream packet parser 802-U, USB Link Controller 804 detects removal of a device directly connected to a downstream port, and detects removal of a device from one of the USB hubs connected to a downstream port. The latter is performed by monitoring hub port change messages sent to the host.

When device attachment and removal is detected, USB Link Controller 804 updates device table 814 and sends a report to the system controller 704 via configuration/control lines 720.

Alternatively, link controller 804 can raise an interrupt and system controller 704 can read the contents of table 814. System controller 704 can also poll the contents of table 814 at any time.

As mentioned above, using the information regarding attached and removed devices, USB Link Controller 804 maintains table 814 of all connected devices. In embodiments, table 814 lists up to 127 connected devices. For example, USB Link Controller 804 parses descriptors during device enumeration and extracts information such as device class, vendor and product ID, serial number and additional identifying information. Accordingly, in embodiments, the table 814 contains information about each attached device including device address, endpoints, device class, manufacturer, and serial number.

In addition to the connected devices list in table 814, table 814 includes entries (32 in one example embodiment) that lists the "allowed devices" that are allowed to connect, along with their respective keys in keys storage 820. When a new device connects (for the first time) the link controller 804 will query the system controller 704 if this device can send/receive data to/from the host CPU. If it can, then the system controller 704 will provide the appropriate key for that device (possibly after it obtained it from the remote management system 106) and that device with its key in store 820 will be entered into the "allowed devices" portion of table 814. When this device connects again, its ID will already be entered in the table (along with its key) and will be allowed to connect right away.

In embodiments, the connected devices portion of table 814 is like a cache (e.g. a software managed cache). If it fills up, and a new device connects, then one of the older entries needs to be deleted. Also, any entry can be deleted at any time. Note that each secure USB device has its own associated key, controlled by the remote management system 106. So, for example, if one user writes an encrypted file to a USB drive and gives that same drive to another user to insert and read on his secure computer, then the remote management system 106 can determine if the other user has privileges to read that device (based on who accessed it last, worker's security level or group belonging, etc.). If the second user does have the requisite privileges, then system 106 sends the second secure computer device's key so he/she can access the device's data.

In response to reports of newly attached devices, system controller 704 provides configuration information to USB Link Controller 804. This information can include whether to encrypt communications to the device. This configuration information can also be maintained in table 814.

Encryption key cache controller 818 includes logic for managing encryption keys 820. For example, when a device has been configured for encrypted communications, system controller 704 may further provide an encryption key to use for that device. Encryption key cache controller 818 stores the encryption key in store 820 and associates it with the configured device. USB Link Controller 804 also includes logic for holding off USB traffic during the process of receiving an encryption key.

It should be noted that, although shown separately in FIG. 8, encryption controller 816 and encryption key cache controller 818 may be implemented together with link controller 804, for example as firmware executing on a common controller. Those skilled in the art will be able to understand how to implement the functionality of the various blocks in FIG. 8 using any combination of hardware, software, firmware, etc. after being taught by the present disclosure.

In response to packets being received on an upstream port and being destined for a device for which encryption is configured, USB Link Controller 804 enables payload encryption in the downstream direction by controlling mux 818-D.

In response to packets being received on a downstream port and being originated from a device for which encryption is configured, USB Link Controller 804 enables payload decryption in the upstream direction by controlling mux 818-U.

As is known, all USB packets include a 16-bit CRC value based on the payload contents. This value is no longer valid if packets are encrypted. Accordingly, Cyclic Redundancy Check (CRC) generator module 806 (for both upstream and downstream directions) generates a new CRC value for all modified USB packets inserted by the Link Controller 804.

Encryption module 808 encrypts the payload inside USB packets using the appropriate key stored for a device in 820 before passing the packet to the downstream USB device. USB Link Controller 804 decides which packets require encryption and controls mux 818-D and encryption controller 816 appropriately.

Decryption module 810 decrypts payload inside USB packets using the appropriate key stored in 820 for the device before passing the packet to the upstream USB host. USB Link Controller 804 decides which packets require decryption and controls mux 418-U and encryption controller 816 appropriately.

USB Transceiver controller 812 implements interface logic to the USB Phy. Depending on implementation, the USB Phy may be internal or external to the secure USB subsystem.

Figure 9:
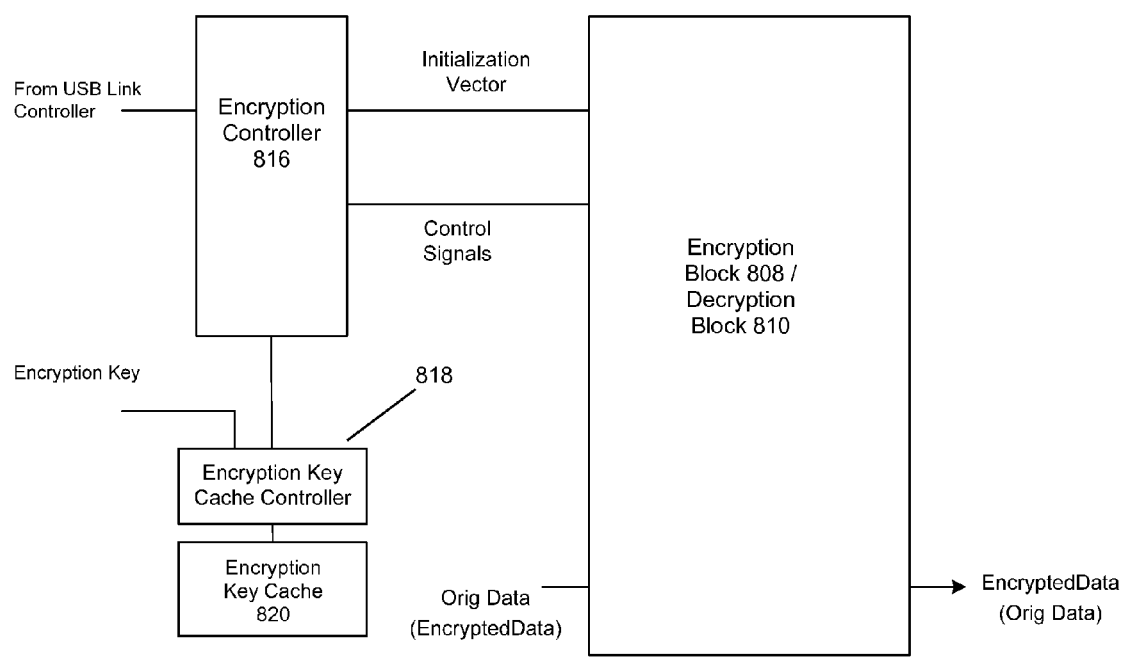
FIG. 9 is a block diagram illustrating an encryption or decryption layer that can be included in the bridge logic shown in FIG. 8.

Additional aspects of encryption and decryption performed by modules 808, 810, 816 and 818 according to example embodiments of the invention will be described in more detail in connection with FIG. 9. More particularly, FIG. 9 is a block diagram illustrating encryption controller 816, encryption key cache controller 818 and encryption/decryption modules 808/810 in alternative detail.

As shown, in response to signals from link controller 804, encryption controller provides an Initialization Vector (IV) and control signals to encryption/decryption modules 808/810.

Encryption key cache 820 stores previously used encryption keys in order to reduce data encryption/decryption latency. The cache can be implemented using FPGA or ASIC embedded memory. Encryption key cache controller 818 interfaces with the system controller 704 to manage encryption keys provided by the remote management system 106 and to provide status messages containing a current state of cache 820.

In embodiments, cache 820 contains both the key and properties for the USB device 610 associated with the key, such as USB-assigned address, device class, and serial number that uniquely identify the device.

Figure 10:
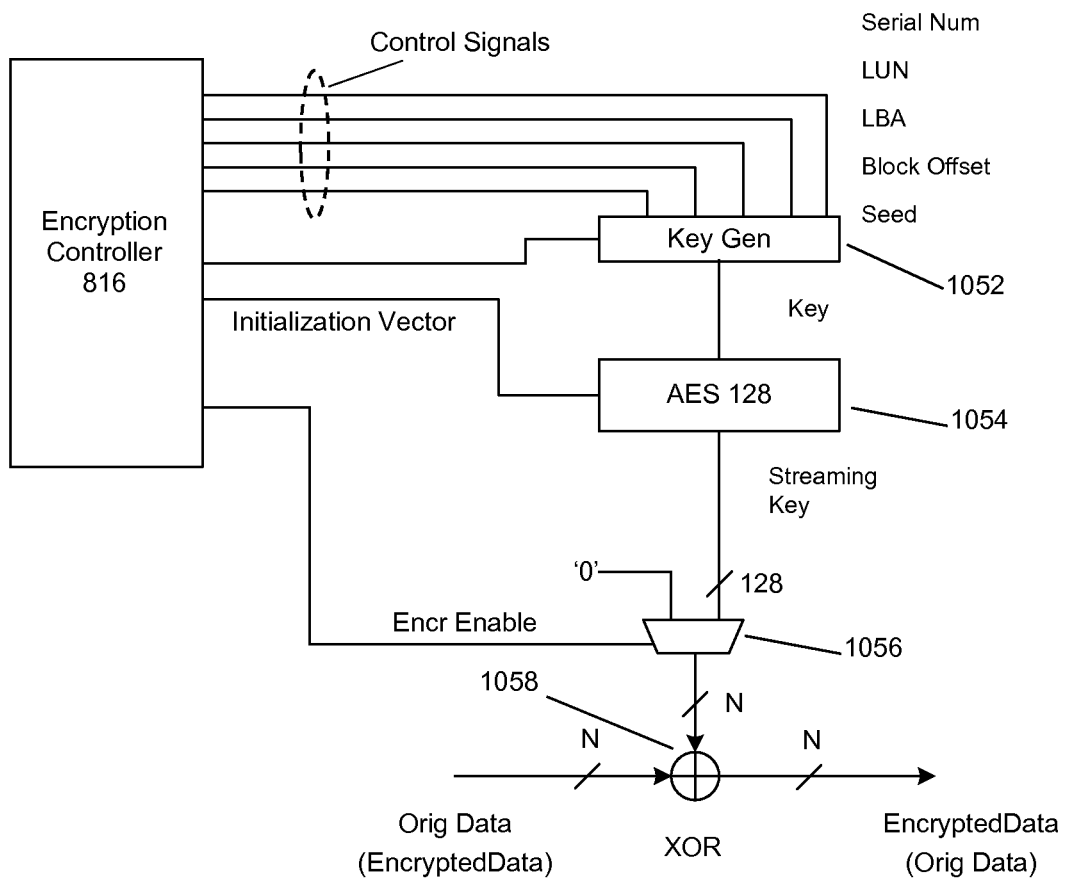
FIG. 10 is a block diagram further illustrating an example implementation of encryption or decryption logic such as that included in the layer of FIG. 9.

FIG. 10 is a block diagram further illustrating an example implementation of encryption controller 816 and encryption/decryption module 808/810 for USB storage devices according to embodiments of the invention. In this example embodiment, the encryption layer of the invention uses an AES 128 encryption algorithm in streaming mode.

In this example embodiment, in addition to parameters obtained from the device and the location of the data to be encrypted, control signals sent by encryption controller 816 include information that uniquely identifies the device 610, but it does not come from the device itself. It is provided by the remote management system 106 instead. The reason for that is improved security. For example, even if somebody is able to reverse-engineer the key generation algorithm, and retrieve the additional values for control signals LUN, LBA, Serial Number and block offset from the device 610, the seed will still be missing.

Key generation module 1052 receives the device serial number, Logical Unit Number (LUN), Logical Block Address (LBA), block offset, and seed as inputs from controller 816 and generates a key for AES128 encryption module 1054. Key size can be 128, 196, 256, or any other size, depending on the desired security level.

AES128 1054 is an encryption block that generates a streaming key using the unique Initial Vector (IV) and the key generated by module 1052.

As further shown in the example of FIG. 10, control signals from controller 816 include an Encryption Enable input to the multiplexer 1058 which causes it to select between '0' (no encryption), or a portion N of the 128-bit streaming key, depending on the data width.

Encryption controller 816 interfaces with the I/O Link Controller 804, and performs overall control of the data encryption/decryption. As described above, Link Controller 804 provides all the necessary signals that allow determining whether a packet needs encryption/decryption, and packet boundaries.

Encryption and decryption blocks 808 and 810 are symmetric: both use the same encryption key.

FIG. 10 depicts an AES algorithm in stream cipher mode. However, it should be noted that in alternative embodiments, the Encryption Layer of the invention can be implemented using block cipher mode. The differences are the way Key Generation, and AES 128 blocks are connected. Each mode—block cipher and stream cipher—have advantages and drawbacks. Block cipher requires data in units of 512 Bytes for encryption. That introduces latency on the IO datapath. On the other hand, stream cipher can work with any data units, even as small as 1 Byte. Stream cipher has lower latency, but is considered less cryptographically strong.

It should be further noted that other encryption algorithms besides AES may be deployed in alternative embodiments. For example, DES, 3DES, etc. . . . or proprietary algorithms (such that may be used by military, defense department, etc.) may be used.

Figure 11:
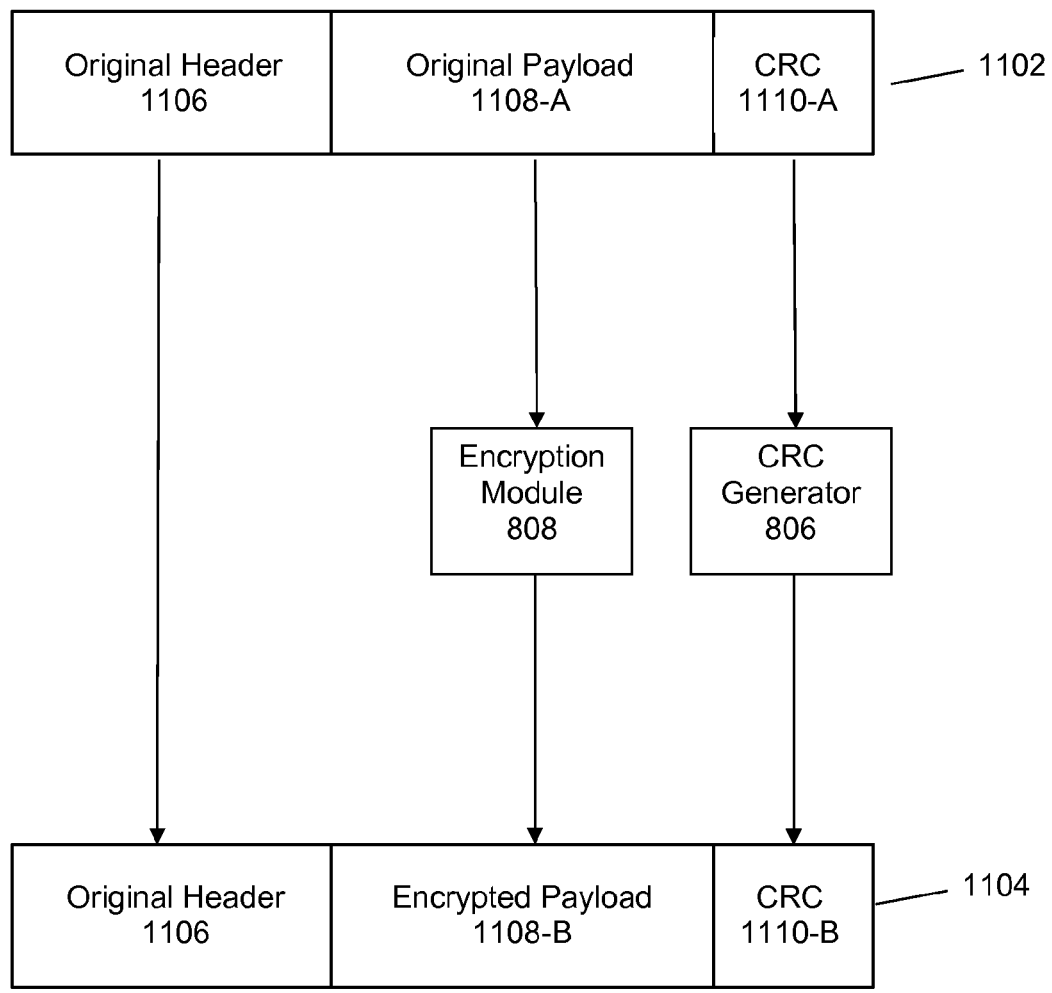
FIG. 11 is a block diagram illustrating the encryption of USB packets according to embodiments of the invention.

FIG. 11 illustrates an example encryption process according to embodiments of the invention. More particularly, FIG. 11 shows an example packet 1102 before encryption and after encryption 1104. As shown, packets 1102 and 1104 each include Header 1106, Payload 1108 and CRC 1110. Link controller 804 detects the boundaries of header 1106, payload 1108 and CRC 1110 from the receive and transmit packet parsers and controls the operation of encryption module 808 and CRC generator 806 based on the detected boundaries. When activated by link controller 804, encryption module 808 is responsible for encrypting the original payload 1108-A into encrypted payload 1108-B, while leaving the original header 1106 intact. When activated by link controller 804, CRC Generation module 806 performing CRC recalculation such that original CRC 1110-A is changed to CRC 1110-B based on the changed contents of encrypted payload 1108-B.

Figure 12:
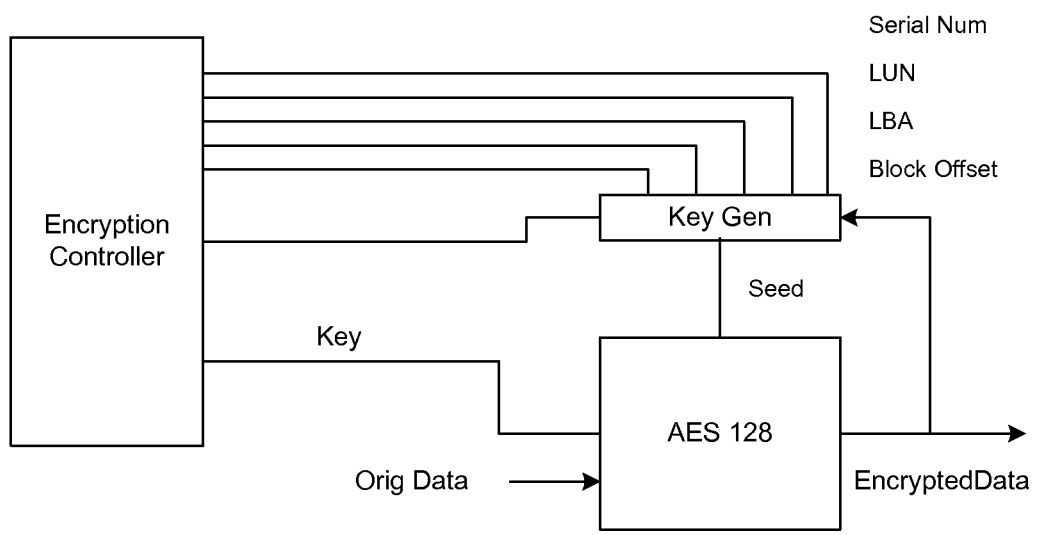
FIG. 12 is a block diagram further illustrating another example implementation of encryption or decryption logic such as that included in the layer of FIG. 9.

FIG. 12 depicts a block diagram of an encryption process in AES128 block mode. The difference from the streaming mode shown in FIG. 10 is that the AES 128 module encrypts original data directly, not the key.

Those skilled in the art will appreciate how the reciprocal process of decryption is performed based on the foregoing example description of the encryption process.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A system for transparently encrypting and decrypting computer system I/O data, comprising:
   an I/O interface;
   a host processor including a host for sending and receiving data via the I/O interface;
   a secure subsystem interposed between the I/O interface and the host processor that transparently encrypts and decrypts the data, the secure subsystem including:
   bridge logic coupled to intercept the data and to detect new devices connected to the I/O interface, and
   a controller that receives information about a new device connected to the I/O interface from the bridge logic and configures the bridge logic for encrypting and decrypting the intercepted data in accordance with the information.

2. A system according to claim 1, wherein the I/O interface comprises one of USB, SAS, SATA, Firewire, Hypertransport, and Thunderbolt.

3. A system according to claim 1, wherein the controller that further determines what data communicated with the new device to encrypt.

4. A system according to claim 3, wherein the controller further determines start and end boundaries of data to be encrypted or decrypted.

5. A system according to claim 1, wherein the secure subsystem includes a CRC generator that recalculates a CRC after packet payload is encrypted or decrypted.

6. A system according to claim 1, wherein the secure subsystem includes an encryption cache controller that stores and manages previously used encryption keys.

7. A system according to claim 1, wherein the secure subsystem maintains a table of all connected I/O devices.

8. A system according to claim 7, wherein the table contains all the information about the devices sufficient for their unique identification, including one or more of device address, device class, device manufacturer, endpoints, and serial number.

9. A system according to claim 1, wherein the host processor and the secure subsystem are incorporated together on a common printed circuit board (PCB) and coupled together via PCB traces.

10. A system according to claim 1, wherein the host processor and the secure subsystem are incorporated together in a single system on a chip (SOC).

11. A system according to claim 1, wherein the controller further configures the bridge logic in accordance with a local security policy.

12. A system according to claim 1, wherein the controller further configures the bridge logic in accordance with control messages from a remote management system.

13. A method of transparently encrypting and decrypting computer system I/O data, comprising:
- receiving one or both of an encryption key and a seed for a specific I/O device;
- receiving data from an I/O interface, wherein the data is sent from or Intended to be received by a host processor including a host for the I/O interface; and
- interposing a secure subsystem between the I/O interface and the host processor that transparently, from the standpoint of the host, encrypts and decrypts the data using one or both of the encryption key and the seed, wherein one or both of the encryption key and seed is received from a remote management system.

14. A method according to claim 13, wherein one or both of the encryption key and the seed is stored in a local cache.

15. A method according to claim 13, further comprising sending a current state of the connected I/O devices to the remote management system.

16. A method according to claim 13, wherein encrypting includes using one or both of stream and block ciphers.

17. A method according to claim 13, wherein encrypting uses one or more of a unique serial number of the device, and a unique address that identifies a data block.

18. A method according to claim 13, wherein the secure subsystem transparently encrypts and decrypts the data using the seed and the seed is received from the remote management system.

19. A method, comprising:
- encrypting data stored on a peripheral device by a first computer using an encryption key;
- detecting an attachment of the peripheral device to a second computer;
- sending information about the peripheral device to a remote management system via a network in response to the attachment;
- receiving the encryption key at the second computer; and
- decrypting the data stored on the peripheral device at the second computer using the received encryption key.

20. A method according to claim 19, wherein the information includes one or more of device address, device class, device manufacturer, endpoints, and serial number.

21. A method according to claim 19, wherein the receiving step is performed only if a user associated with the second computer is authorized by the remote management system.

22. A method according to claim 19, wherein the encrypting and decrypting are performed transparently to peripheral hosts respectively associated with the first and second computers.

* * * * *